US012591276B2

(12) United States Patent
Lin et al.

(10) Patent No.: US 12,591,276 B2
(45) Date of Patent: Mar. 31, 2026

(54) HINGE FOR A FLEXIBLE ELECTRONIC DEVICE

(71) Applicant: FOSITEK CORPORATION, New Taipei City (TW)

(72) Inventors: Chun-Han Lin, New Taipei City (TW); Yung-Chih Tseng, New Taipei City (TW); Hao-Yun Lee, New Taipei City (TW)

(73) Assignee: FOSITEK CORPORATION, New Taipei City (TW)

( * ) Notice: Subject to any disclaimer, the term of this patent is extended or adjusted under 35 U.S.C. 154(b) by 187 days.

(21) Appl. No.: 18/735,411

(22) Filed: Jun. 6, 2024

(65) Prior Publication Data

US 2025/0298441 A1 Sep. 25, 2025

(30) Foreign Application Priority Data

Mar. 22, 2024 (TW) ................................. 113110700

(51) Int. Cl.
*G06F 1/16* (2006.01)

(52) U.S. Cl.
CPC .......... *G06F 1/1652* (2013.01); *G06F 1/1681* (2013.01)

(58) Field of Classification Search
CPC ..... G06F 1/1652; G06F 1/1681; G06F 1/1641
See application file for complete search history.

(56) References Cited

U.S. PATENT DOCUMENTS

| | | | | |
|---|---|---|---|---|
| 11,832,405 | B2 * | 11/2023 | Zhang | F16C 11/04 |
| 11,841,046 | B2 * | 12/2023 | Lin | G06F 1/1616 |
| 11,960,324 | B2 * | 4/2024 | Sun | G06F 1/1652 |
| 12,109,453 | B2 * | 10/2024 | Dervisoglu | A63B 24/0062 |
| 12,173,541 | B2 * | 12/2024 | Chung | G06F 1/1681 |
| 12,181,935 | B2 * | 12/2024 | Hsiang | G06F 1/1624 |
| 12,200,884 | B2 * | 1/2025 | Feng | G06F 1/1616 |
| 12,242,301 | B2 * | 3/2025 | Hou | G06F 1/1652 |
| 12,271,236 | B2 * | 4/2025 | Feng | H04M 1/022 |
| 12,306,671 | B2 * | 5/2025 | Caplow-Munro | G06F 1/1641 |
| 12,341,917 | B2 * | 6/2025 | Moon | G06F 1/1656 |
| 12,342,483 | B2 * | 6/2025 | Ye | H04M 1/022 |
| 12,353,256 | B2 * | 7/2025 | Wang | G06F 1/1656 |
| 12,422,898 | B2 * | 9/2025 | Nakazawa | G06F 1/1616 |
| 12,429,924 | B2 * | 9/2025 | Feng | G06F 1/16 |
| 12,429,925 | B2 * | 9/2025 | Zhang | H04M 1/0247 |
| 12,461,556 | B2 * | 11/2025 | Lee | G06F 1/1677 |
| 12,468,352 | B2 * | 11/2025 | Zhang | F16C 11/04 |

* cited by examiner

*Primary Examiner* — Rockshana D Chowdhury
(74) *Attorney, Agent, or Firm* — BURRIS LAW, PLLC

(57) ABSTRACT

A hinge is mountable between two support parts of a flexible electronic device for mounting a flexible display thereon. Each support part includes first, second and third support plates. The hinge includes two rotating units rotatably mounted at two sides of a base seat to be shifted among an unfolded state, a transition folded state and a fully folded state. Each rotating unit includes a primary rotating member, a secondary rotating member, first and second shaft members and a support bracket. In the transition folded state, the first, second and third support plates cooperatively define two parallel planes for resting two halves of the flexible display. During shifting to the fully folded state, the shaft members are inclined to bring the third support plates close to each other such that a distance between the third support plates is smaller than that between the first support plates.

5 Claims, 8 Drawing Sheets

HINGE FOR A FLEXIBLE ELECTRONIC DEVICE

CROSS-REFERENCE TO RELATED APPLICATION

This application claims priority to Taiwanese Patent Application No. 113110700, filed on Mar. 22, 2024, and incorporated by reference herein in its entirety.

FIELD

The disclosure relates to a hinge for a flexible electronic device, and more particularly to a hinge mountable between two support parts of a flexible electronic device for mounting a flexible display thereon.

BACKGROUND

Electronic devices such as foldable phones or tablets have recently gradually become more popular, and hinges used in such foldable electronic devices are mounted between two casings of the foldable electronic device to support a flexible display to unfold or fold the flexible display. As a variety of accessories are used with the foldable electronic devices, there is a need to hold the accessory between the two casings of the foldable electronic device when the flexible display is folded.

SUMMARY

Therefore, an object of the disclosure is to provide a hinge that can alleviate at least one of the drawbacks of the prior art.

According to the disclosure, the hinge is mountable between two support parts of a flexible electronic device for mounting a flexible display thereon. Each support part includes a first support plate, a second support plate and a third support plate. The hinge includes a base seat and two rotating units respectively and rotatably mounted at two sides of the base seat. The two rotating units are shiftable among an unfolded state, a transition folded state and a fully folded state. Each of the rotating units includes a primary rotating member, a secondary rotating member, at least one first shaft member, at least one second shaft member and a support bracket. The primary rotating member is disposed on and rotatable relative to the base seat about a primary rotating axis, and has a rotating body for resting the first support plate thereon, and a slide slot which is formed in the rotating body and extends away from the base seat to have an inner end portion proximate to the base seat and an outer end portion distal from the base seat. The secondary rotating member is disposed on and rotatable relative to the base seat about a secondary rotating axis which is parallel to and offset from the primary rotating axis of the primary rotating member. The secondary rotating member has a sliding locking portion which is slidably disposed in the slide slot. The first shaft member and the second shaft member are pivotably connected with the primary rotating member and extend parallel to each other and away from the base seat. The sliding locking portion is interposed between the first shaft member and the second shaft member. The first shaft member is disposed for resting the second support plate thereon, and the second shaft member has a recess which is formed adjacent to the slide slot and faces the first shaft member to partially receive the sliding locking portion therein. The support bracket is pivotably connected with distal ends of the first and second shaft members and extends away from the base seat for resting the third support plate thereon. In the unfolded state, the sliding locking portion of the secondary rotating member is positioned in the outer end portion of the slide slot and sandwiched between the first shaft member and the second shaft member to restrain turning of the first and second shaft members relative to the primary rotating member, and the first and second shaft members extend along an extending direction which is substantially parallel to that of the slide slot such that the first support plates, the second support plates and the third support plates of the two support parts cooperatively define a plane for resting the flexible display thereon. In the transition folded state, the sliding locking portion is positioned in the inner end portion of the slide slot and outwardly of the recess of the second shaft member, the extending direction of the first and second shaft members is parallel to that of the slide slot such that the first support plates, the second support plates and the third support plates of the two support parts cooperatively define two planes which are parallel to each other and adjacent to the two sides of the base seat, respectively, for resting two halves of the flexible display, respectively, and the recess permits turning of the second shaft member toward the sliding locking portion and permits turning of the first shaft member and the second shaft member relative to the primary rotating member. During shifting of the two rotating units from the transition folded state to the fully folded state, the second shaft member is turned toward the sliding locking portion, and the first shaft member and the second shaft member are inclined relative to the slide slot of the primary rotating member to bring the sliding locking portion to be partially received in the recess and to bring the third support plates close to each other such that a distance between the third support plates is smaller than that between the first support plates in the fully folded state.

The two rotating units are shiftable between the transition folded state and the fully folded state. In the fully folded state, the distance between the third support plates is smaller than that between the first support plates such that the flexible display is received between the first support plates and is folded with a tear drop-shaped cross-section. In the transition folded state, the first support plates, the second support plates and the third support plates of the two support parts cooperatively define two planes parallel to each other such that the flexible display is folded with a U-shape cross-section to define the receiving space for receiving an accessory between the two halves thereof.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
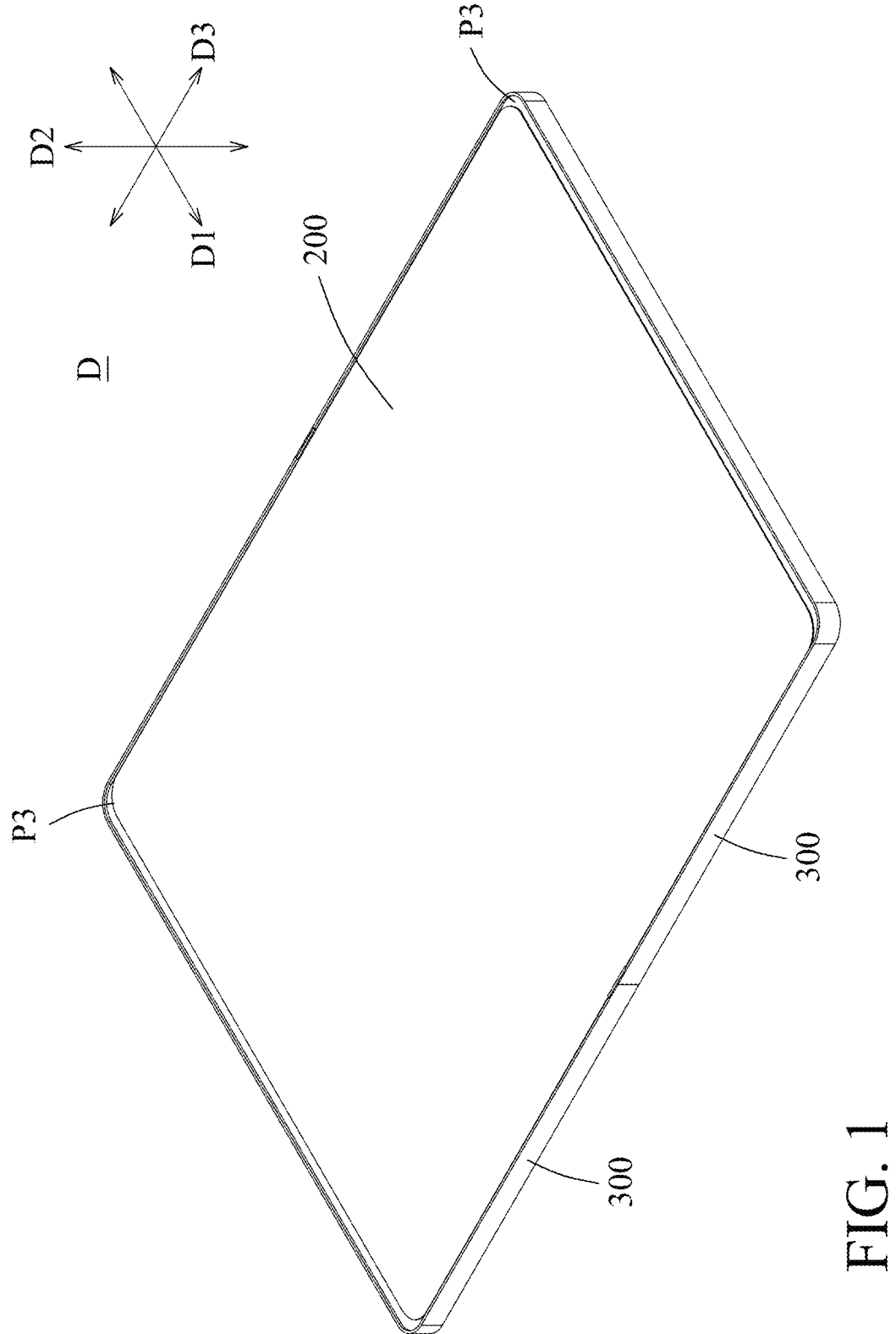
FIG. 1 is a perspective view illustrating an embodiment of a hinge according to the disclosure mounted on a flexible electronic device in an unfolded state.
Figure 2:
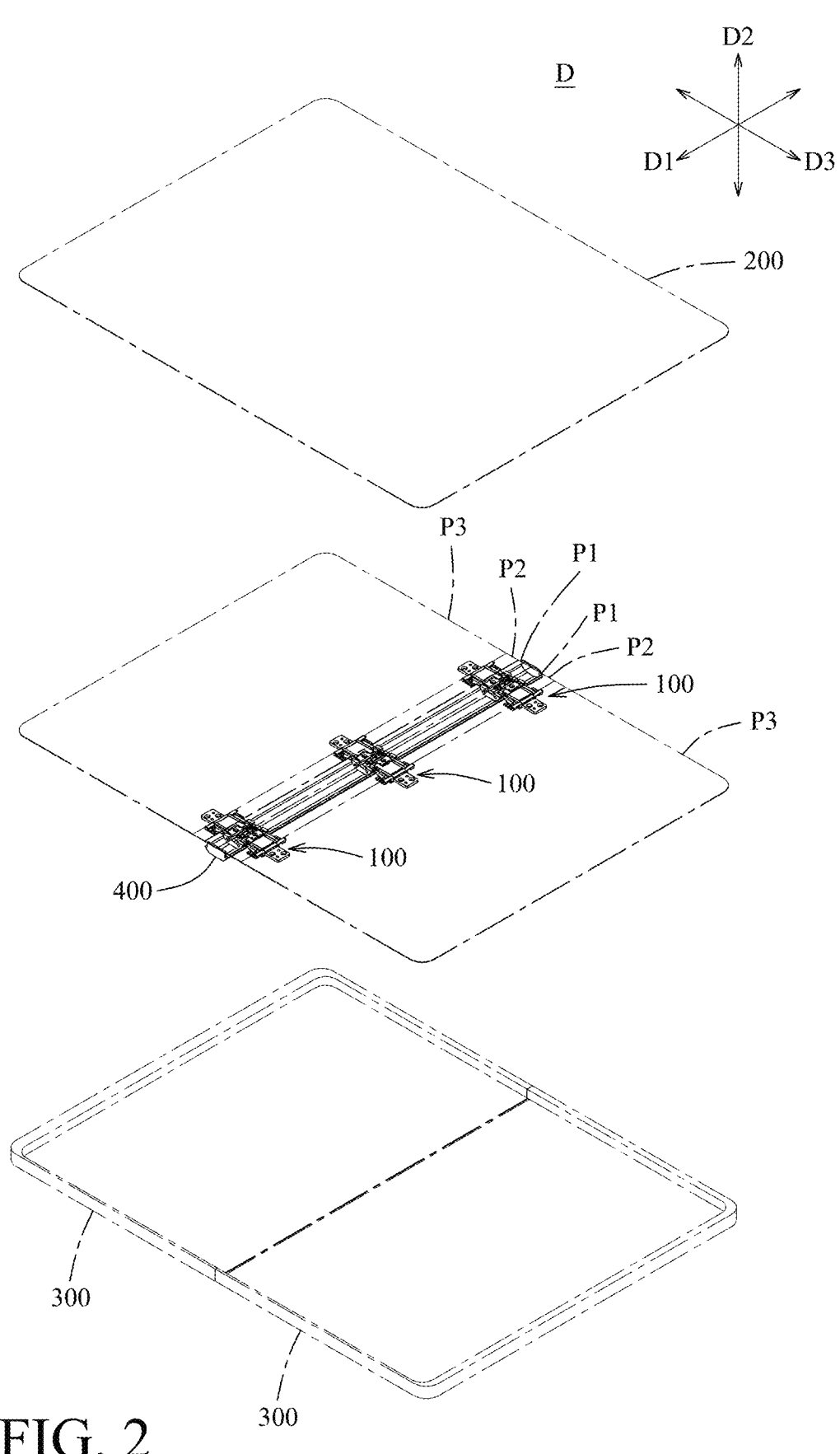
FIG. 2 is an exploded perspective view of FIG. 1.
Figure 3:
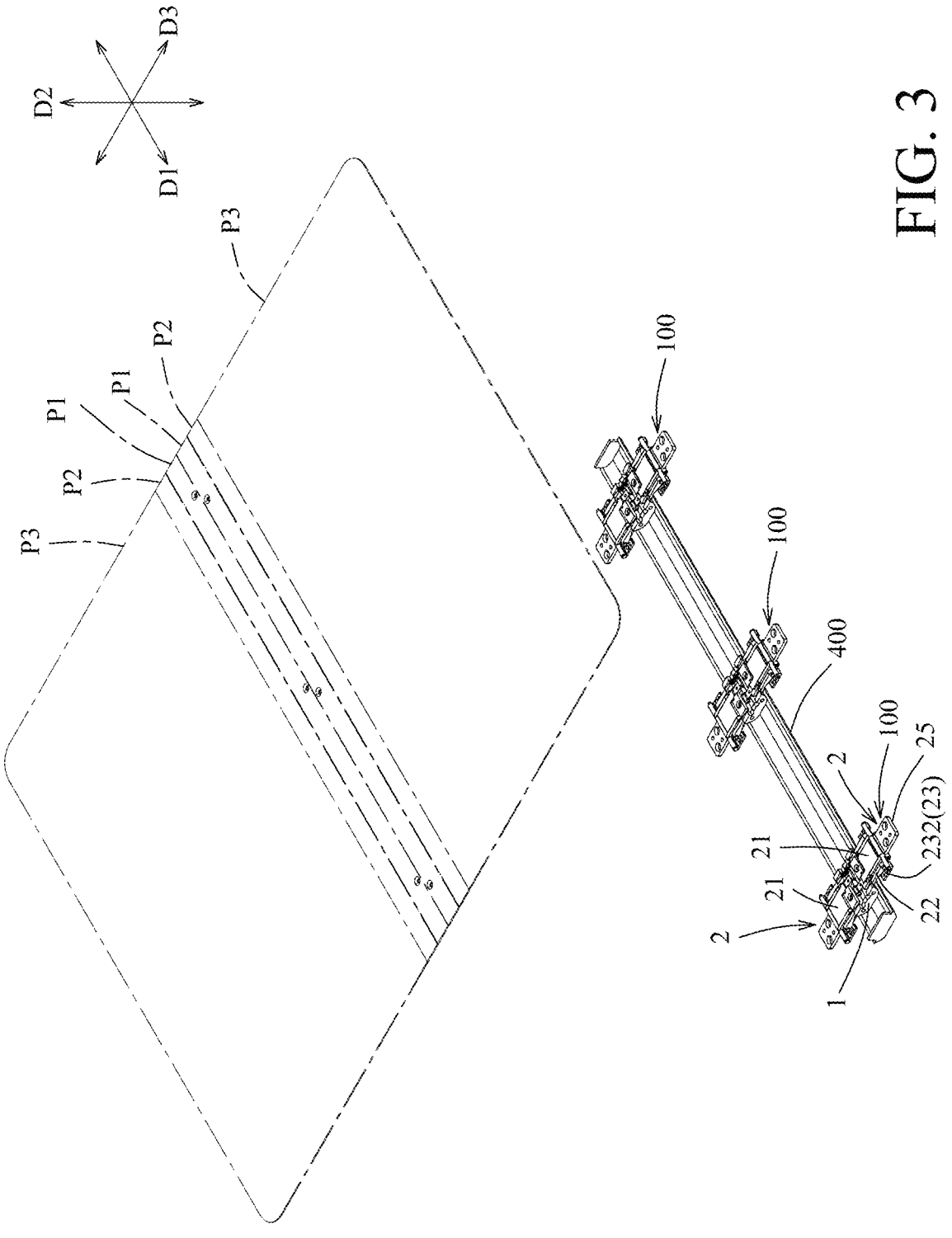
FIG. 3 is an exploded perspective view of a portion of FIG. 2.
Figure 4:
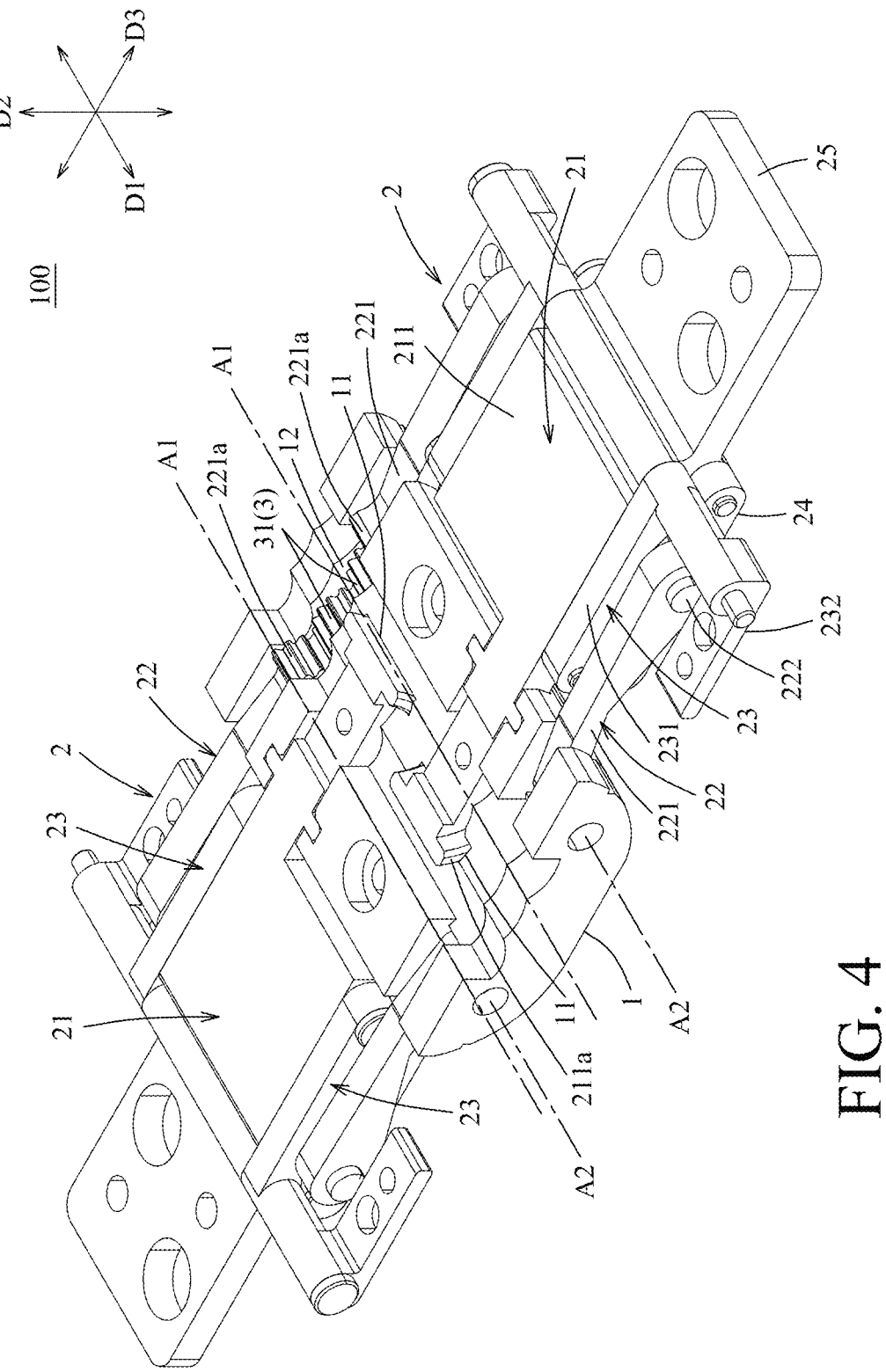
FIG. 4 is a perspective view of the embodiment.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 1 to 4, an embodiment of a hinge 100 according to the disclosure is mounted between two support parts of a flexible electronic device (D) for mounting a flexible display 200 thereon. Each support part includes a first support plate (P1), a second support plate (P2) and a third support plate (P3). The third support plates (P3) of the support parts are securely mounted on two housings 300, respectively, to open and close the two housings 300. The flexible electronic device (D) may be a tablet PC, a mobile phone or a portable PC, etc. In this embodiment, three of the hinges 100 are mounted on the flexible electronic device (D). The hinge 100 includes a base seat 1, two rotating units 2 and a synchronizing unit 3.

The hinges 100 are arranged along a front-rear direction (D1), and the base seat 1 of each hinge 100 is disposed on a base cover 400 in an up-down direction (D2). The base seat 1 has two arcuate slots 11 which are respectively formed at two sides thereof and extend arcuately and respectively about two primary rotating axes (A1) that are parallel to each other in the front-rear direction (D1) and aligned with each other in a left-right direction (D3), and a pinion receiving slot 12. The two arcuate slots 11 are spaced apart from each other in the front-rear direction (D1). In this embodiment, the two primary rotating axes (A1) are located upwardly of the base seat 1. The two arcuate slots 11 are formed to correspond to the two rotating units 2.

Figure 7:
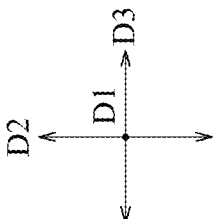
FIG. 7 is a fragmentary sectional view similar to FIG. 6, illustrating that the two rotating units are in a transition folded state.
Figure 7:
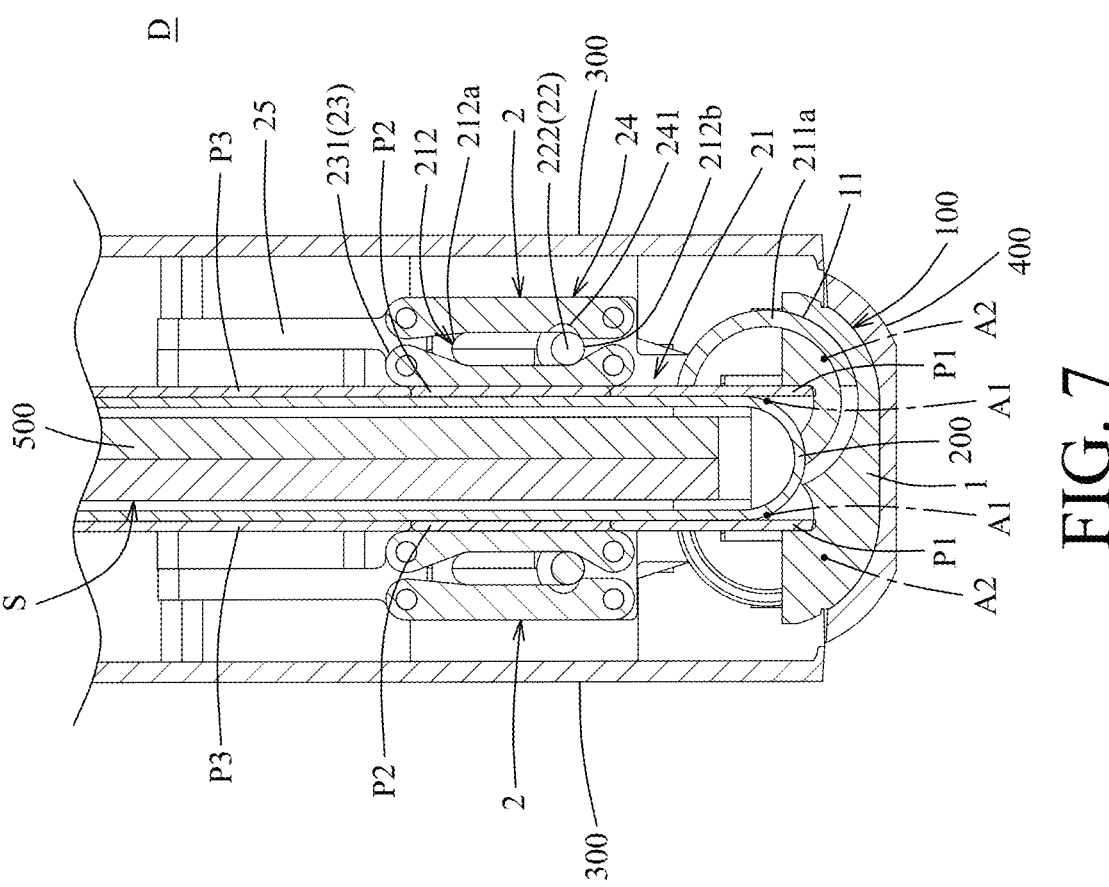
Figure 8:
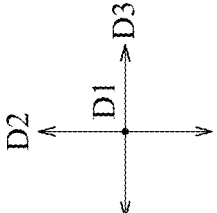
FIG. 8 is a fragmentary sectional view similar to FIG. 6, illustrating that the two rotating units are in a fully folded state.
Figure 8:
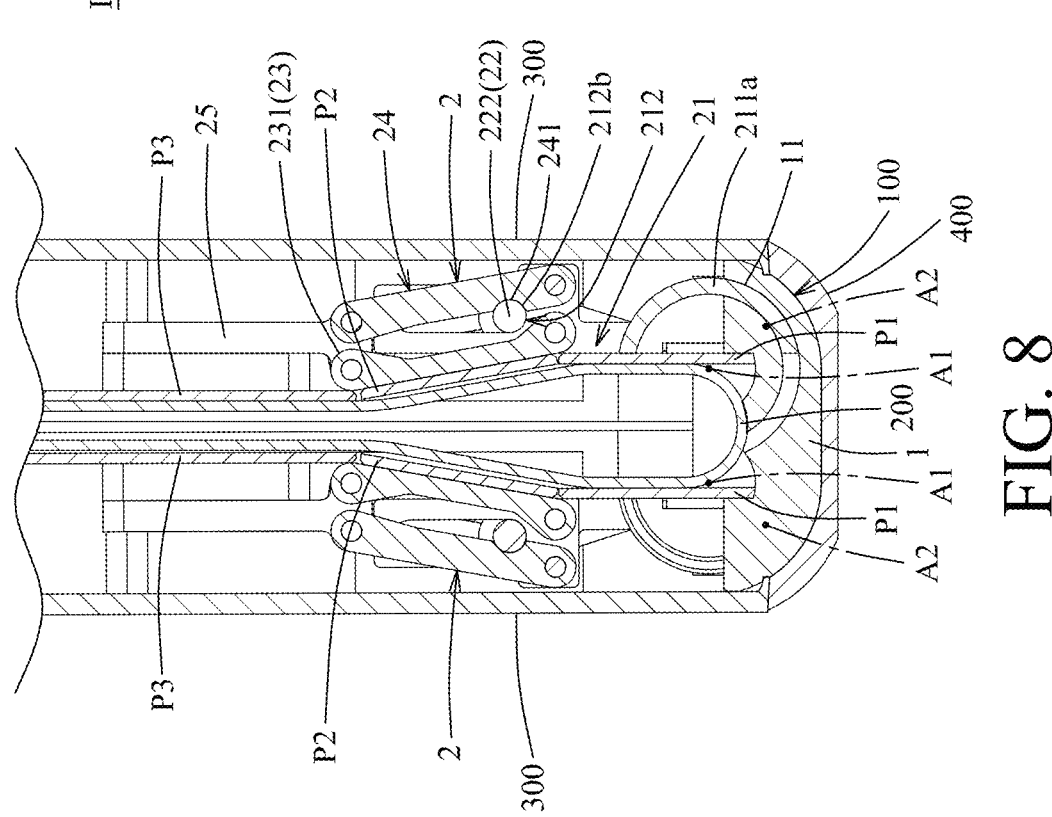

With reference to FIGS. 2 to 5, two rotating units 2 are respectively and rotatably mounted at the two sides of the base seat 1, and are shiftable among an unfolded state, a transition folded state (see FIG. 7) and a fully folded state (see FIG. 8). Each rotating unit 2 includes a primary rotating member 21, a secondary rotating member 22, two first shaft members 23, two second shaft members 24 and a support bracket 25.

The primary rotating member 21 is disposed on and rotatable relative to the base seat 1 about one of the primary rotating axes (A1), and has a rotating body 211 for resting the first support plate (P1) thereon, a slide slot 212 which is formed in the rotating body 211 and penetrates therethrough in the front-rear direction (D1) and extends away from the base seat 1 to have an inner end portion (212*b*) proximate to the base seat 1 and an outer end portion (212*a*) distal from the base seat 1, and an arcuate key (211*a*) which is formed on the rotating body 211 and opposite to the slide slot 212 in the left-right direction (D3) and which is slidably engaged with the corresponding arcuate slot 11.

The secondary rotating member 22 is disposed on and rotatable relative to the base seat 1 about a secondary rotating axis (A2) which is parallel to and offset from the primary rotating axis (A1) of the primary rotating member

21. Specifically, the secondary rotating members 22 of the two rotating units 2 are pivotably connected with the base seat 1 about two of the secondary rotating axes (A2), respectively, that are parallel to each other in the front-rear direction (D1) and aligned with each other in the left-right direction (D3). The two secondary rotating axes (A2) are located downwardly of the primary rotating axes (A1) and outwardly of the primary rotating axes (A1) in the left-right direction (D3). The secondary rotating member 22 has two rotating arms 221 which are spaced apart from each other in the front-rear direction (D1) to be respectively disposed at front and rear sides of the primary rotating member 21 and which are pivotably connected with the base seat 1, and a sliding locking portion 222 which interconnects the rotating arms 221 and which is slidably disposed in the slide slot 212. A portion of one rotating arm 221 is disposed in the pinion receiving slot 12, and has a toothed portion (221*a*).

The two first shaft members 23 and the two second shaft members 24 are pivotably connected with the primary rotating member 21 and extend parallel to each other and away from the base seat 1. The first shaft members 23 are spaced apart from each other in the front-rear direction (D1) to be located at front and rear sides of the primary rotating member 21, respectively. The second shaft members 24 are spaced apart from each other in the front-rear direction (D1) to be respectively located at front in and rear sides of the primary rotating member 21, and respectively grouped with the adjacent first shaft members 23 into a group. In this embodiment, the number of the first shaft members 23 and the second shaft members 24 is two, but there may be only one or each in other embodiments.

Each first shaft member 23 has a first shaft portion 231 pivotably connected with the primary rotating member 21, and a mounting portion 232 extending from the first shaft portion 231 in the front-rear direction (D1) for resting the corresponding second support plate (P2) thereon. The first shaft portion 231 is aligned with the corresponding second shaft member 24 and extends away from the base seat 1 such that the sliding locking portion 222 of the secondary rotating member 22 is interposed between the first shaft portion 231 of the first shaft member 23 and the second shaft member 24. The second shaft member 24 has a recess 241 which is formed adjacent to the inner end portion (212*b*) of the slide slot 212 and faces the first shaft member 23 to partially receive the sliding locking portion 222 therein.

The support bracket 25 is pivotably connected with distal ends of the two first shaft members 23 and the two second shaft members 24 and extends away from the base seat 1 for resting the corresponding third support plate (P3) thereon.

The synchronizing unit 3 includes two pinions 31 which are interposed between and respectively mesh with the toothed portions (221*a*) of the secondary rotating members 22 of the two rotating units 2 to make synchronous rotations of the two rotating units 2 relative to the base seat 1. In other embodiments, the synchronizing unit 3 may include racks, linkages and slide rails, etc. Additionally, a torsion unit may be disposed to provide a torsion force during rotation of the two rotating units 2 relative to the base seat 1 so as to angularly position the rotating units 2 and provide an appropriate feel of operation. Alternatively, the synchronizing unit 3 may be connected between the primary rotating members 21 of the rotating units 2 to make synchronous rotations of the two rotating units 2 relative to the base seat 1.

Figure 5:
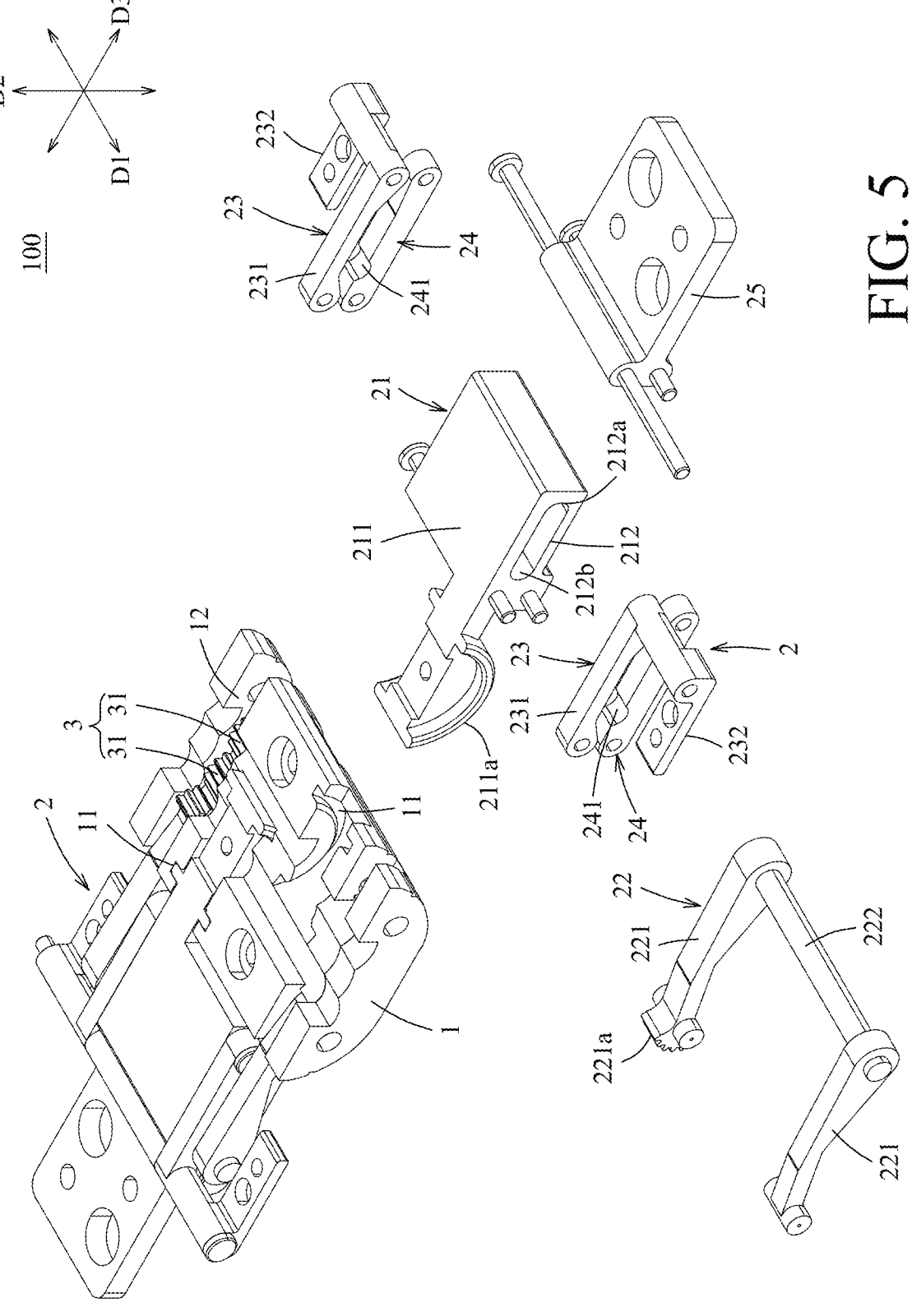
FIG. 5 is an exploded perspective view of the embodiment.
Figure 6:
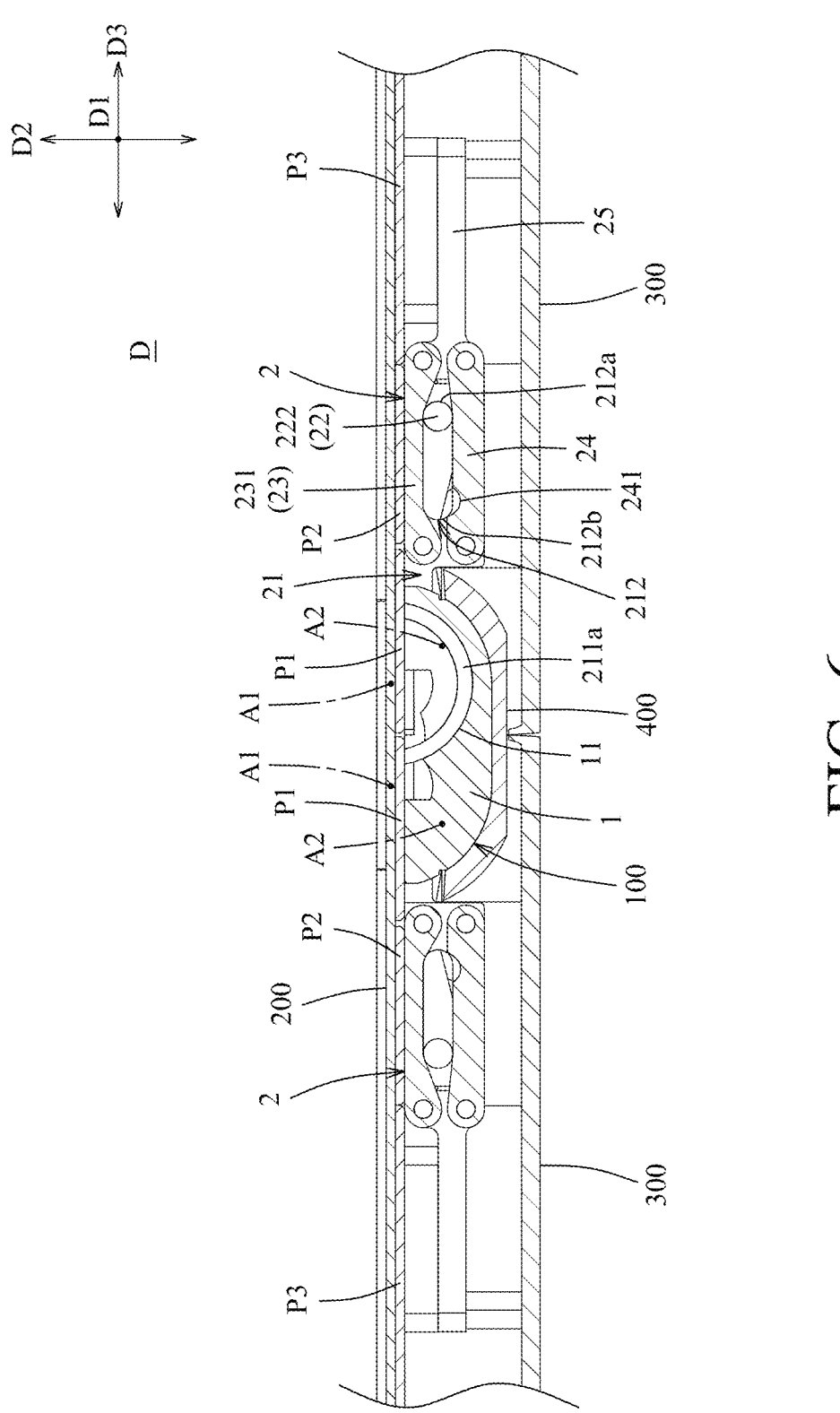
FIG. 6 is a fragmentary sectional view illustrating that two rotating units of the embodiment are in the unfolded state.

With reference to FIGS. 5 and 6, when the rotating units 2 are in the unfolded state, the sliding locking portion 222 of the secondary rotating member 22 is positioned in the outer end portion (212*a*) of the slide slot 212 and sandwiched between the first shaft member 23 and the second shaft member 24 to restrain turning of the first and second shaft members 23, 24 relative to the primary rotating member 21, and the first and second shaft members 23, 24 extend along an extending direction which is substantially parallel to that of the slide slot 212 (in the left-right direction (D3) in this state). Thus, the first support plates (P1), the second support plates (P2) and the third support plates (P3) of the two support parts cooperatively define a plane for resting the flexible display 200 thereon.

With reference to FIGS. 5 and 7, when the rotating units 2 are in the transition folded state, the sliding locking portion 222 is positioned in the inner end portion (212*b*) of the slide slot 212 and outwardly of the recess 241 of the second shaft member 24, the extending direction of the first and second shaft members 23, 24 is parallel to that of the slide slot 212 (in the up-down direction (D2) in this state). Thus, the first support plates (P1), the second support plates (P2) and the third support plates (P3) of the two support parts cooperatively define two planes which are parallel to each other and adjacent to the two sides of the base seat 1, respectively. The flexible display 200 is folded with a U-shape cross-section to have two halves resting respectively on the two planes, and defines a receiving space(S) for receiving an accessory 500 (e.g. a keyboard or the other auxiliary member) therein. In this state, the recess 241 permits turning of the second shaft member 24 toward the sliding locking portion 222 and permits turning of the first shaft member 23 and the second shaft member 24 relative to the primary rotating member 21.

With reference to FIGS. 5, 7 and 8, during shifting of the two rotating units 2 from the transition folded state to the fully folded state, each second shaft member 24 is turned toward the sliding locking portion 222, and the first shaft member 23 and the second shaft member 24 are inclined relative to the slide slot 212 of the primary rotating member 21 to bring the sliding locking portion 222 to be partially received in the recess 241 and to bring the third support plates (P3) close to each other. As such, a distance between the third support plates (P3) is smaller than that between the first support plates (P1) in the fully folded state. The flexible display 200 is folded with a tear drop-shaped cross-section. Since only the two third support plates (P3) are moved toward each other when the two rotating units 2 are shifted from the transition folded state to the fully folded state, a relatively large space is provided for receiving the bending portion of the flexible display 200 to prevent excess bending and damage to the flexible display 200. Furthermore, with the two housings 300 being respectively and securely mounted on the two third support plates (P3), when the two rotating units 2 are shifted from the transition folded state to the fully folded state, the distance between the two housings 300 is decreased.

In this embodiment, the second shaft member 24 is provided with a chamfer structure adjacent to the recess 241 to facilitate engagement with and disengaged from the recess 241.

As illustrated, the two rotating units 2 are shiftable between the transition folded state and the fully folded state. In the fully folded state, the distance between the third support plates (P3) is smaller than that between the first support plates (P1) such that the flexible display 200 is received between the first support plates (P1) and is folded with a tear drop-shaped cross-section. In the transition folded state, the first support plates (P1), the second support plates (P2) and the third support plates (P3) of the two support parts cooperatively define the two planes parallel to each other such that the flexible display 200 is folded with a U-shape cross-section to define the receiving space(S) for receiving an accessory 500 between the two halves thereof.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge mountable between two support parts of a flexible electronic device for mounting a flexible display thereon, each support part including a first support plate, a second support plate and a third support plate, comprising:
    a base seat; and
    two rotating units respectively and rotatably mounted at two sides of said base seat, and shiftable among an unfolded state, a transition folded state and a fully folded state, each of said rotating units including
    a primary rotating member disposed on and rotatable relative to said base seat about a primary rotating axis, and having a rotating body for resting the first support plate thereon, and a slide slot which is formed in said rotating body and extends away from said base seat to have an inner end portion proximate to said base seat and an outer end portion distal from said base seat,
    a secondary rotating member disposed on and rotatable relative to said base seat about a secondary rotating axis which is parallel to and offset from the primary rotating axis of said primary rotating member, said secondary rotating member having a sliding locking portion which is slidably disposed in said slide slot,
    at least one first shaft member and at least one second shaft member pivotably connected with said primary rotating member and extending parallel to each other and away from said base seat, said sliding locking portion being interposed between said first shaft member and said second shaft member, wherein said first shaft member is disposed for resting the second support plate thereon, and said second shaft member has a recess which is formed adjacent to said slide slot and faces said first shaft member to partially receive said sliding locking portion therein, and
    a support bracket pivotably connected with distal ends of said first and second shaft members and extending away from said base seat for resting the third support plate thereon,
    wherein, in the unfolded state, said sliding locking portion of said secondary rotating member is positioned in said outer end portion of said slide slot and sandwiched between said first shaft member and said second shaft member to restrain turning of said first and second shaft members relative to said primary rotating member, and said first and second shaft members extend along an extending direction which is substantially parallel to that of said slide slot such that the first support plates, the second support plates and the third support plates of the two support parts cooperatively define a plane for resting the flexible display thereon;
    wherein, in the transition folded state, said sliding locking portion is positioned in said inner end portion of said slide slot and outwardly of said recess of said second shaft member, the extending direction of said first and second shaft members is parallel to that of said slide slot such that the first support plates, the second support plates and the third support plates of the two support parts cooperatively define two planes which are parallel to each other and adjacent to said two sides of said base seat, respectively, for resting two halves of the flexible display, respectively, and said recess permits turning of said second shaft member toward said sliding locking portion and permits turning of said first shaft member and said second shaft member relative to said primary rotating member; and wherein, during shifting of said two rotating units from the transition folded state to the fully folded state, said second shaft member is turned toward said sliding locking portion, and said first shaft member and said second shaft member are inclined relative to said slide slot of said primary rotating member to bring said sliding locking portion to be partially received in said recess and to bring the third support plates close to each other such that a distance between the third support plates is smaller than that between the first support plates in the fully folded state.

2. The hinge of claim 1, further comprising a synchronizing unit which is connected between said rotating units to make synchronous rotations of said two rotating units relative to said base seat.

3. The hinge of claim 2, wherein said secondary rotating member has a toothed portion, said synchronizing unit including two pinions which are interposed between and respectively mesh with said toothed portions of said secondary rotating members of said two rotating units.

4. The hinge of claim 1, wherein said base seat has two arcuate slots which are respectively formed at said two sides thereof and extend arcuately and respectively about two of the primary rotating axes that are parallel to each other, said primary rotating member having an arcuate key which is formed on said rotating body and which is slidably engaged with a respective one of said arcuate slots.

5. The hinge of claim 1, wherein said secondary rotating members of said two rotating units are pivotably connected with said base seat about two of the secondary rotating axes that are parallel to each other.

\*    \*    \*    \*    \*